United States Patent
Heliö et al.

(10) Patent No.: US 12,054,859 B2
(45) Date of Patent: Aug. 6, 2024

(54) DEVICE FOR MANUFACTURING A WEAVE

(71) Applicant: Aurora Propulsion Technologies Oy, Espoo (FI)

(72) Inventors: Matti Heliö, Espoo (FI); Perttu Yli-Opas, Espoo (FI); Jaakko Laitinen, Espoo (FI); Roope Takala, Espoo (FI)

(73) Assignee: Aurora Propulsion Technologies Oy, Espoo (FI)

( * ) Notice: Subject to any disclaimer, the term of this patent is extended or adjusted under 35 U.S.C. 154(b) by 146 days.

(21) Appl. No.: 17/911,846

(22) PCT Filed: Mar. 15, 2021

(86) PCT No.: PCT/FI2021/050185
§ 371 (c)(1),
(2) Date: Sep. 15, 2022

(87) PCT Pub. No.: WO2021/186106
PCT Pub. Date: Sep. 23, 2021

(65) Prior Publication Data
US 2023/0151520 A1 May 18, 2023

(30) Foreign Application Priority Data
Mar. 16, 2020 (FI) ........................... 20205268

(51) Int. Cl.
*D03D 41/00* (2006.01)
*B21F 15/04* (2006.01)
(Continued)

(52) U.S. Cl.
CPC ............. *D04C 3/48* (2013.01); *B21F 15/04* (2013.01); *B64G 1/407* (2013.01);
(Continued)

(58) Field of Classification Search
CPC ... D04C 3/48; D04C 5/06; D04C 1/02; D04C 1/06; D04C 3/10; D04C 3/24;
(Continued)

(56) References Cited

U.S. PATENT DOCUMENTS

| 157,536 A | * 12/1874 | O'Brien et al. ......... A41G 3/00 |
| | | 132/56 |
| 523,415 A | 7/1894 | Shellaburger |

(Continued)

FOREIGN PATENT DOCUMENTS

| EP | 2 187 406 | 5/2010 |
| GB | 1912 13 508 | 2/1913 |

(Continued)

OTHER PUBLICATIONS

International Search Report and Written Opinion of the ISA for PCT/FI2021/050185, dated Jun. 9, 2021 (13 pages).

(Continued)

*Primary Examiner* — Robert H Muromoto, Jr.
(74) *Attorney, Agent, or Firm* — Nixon & Vanderhye PC

(57) ABSTRACT

A device for manufacturing a weave, including a winder for reeling the manufactured weave to a rotating reel, wire spools arranged to release longitudinal wires to said winder, a wire spool carrier comprising a wheel and a slit extending through the wheel from a centre of the wire spool carrier to the circumference, an additional wire spool releasably attached to the wire spool carrier and arranged to release a crossing wire, and an actuator configured to move the wire spool carrier between the longitudinal wires such that the additional wire spool in turns moves to each longitudinal wire to a position where the respective longitudinal wire is located in said slit at which stage the wheel rotates around said respective longitudinal wire before moving towards a following longitudinal wire in such way that a predeter-
(Continued)

mined path of the crossing wire from the additional wire spool forms the weave with the longitudinal wires from the wire spools.

8 Claims, 3 Drawing Sheets

(51) Int. Cl.
| | |
|---|---|
| *D04C 3/48* | (2006.01) |
| *B64G 1/40* | (2006.01) |
| *B64G 1/44* | (2006.01) |
| *H01B 1/02* | (2006.01) |

(52) U.S. Cl.
CPC ...... *D10B 2101/20* (2013.01); *D10B 2505/12* (2013.01); *H01B 1/02* (2013.01)

(58) Field of Classification Search
CPC ........ B21F 15/04; B21F 33/002; B21F 27/02; B64G 1/407; B64G 1/648; D10B 2101/20; D10B 2505/12; H01B 1/02; B64F 5/00
See application file for complete search history.

(56) References Cited

U.S. PATENT DOCUMENTS

| | | | | |
|---|---|---|---|---|
| 612,400 | A | | 10/1898 | Cochrane |
| 743,806 | A | | 11/1903 | Baumgartner |
| 843,299 | A | * | 2/1907 | Raymond ............... B21F 27/06 |
| | | | | 140/15 |
| 983,985 | A | * | 2/1911 | Dwiggins ............... B21F 27/02 |
| | | | | 140/15 |
| 1,095,176 | A | * | 4/1914 | Grime .................... D03D 47/00 |
| | | | | 139/35 |
| 1,141,382 | A | * | 6/1915 | De Leeuw ............... D04C 3/00 |
| | | | | 139/386 |
| 1,465,554 | A | * | 8/1923 | Klein ....................... D04C 3/00 |
| | | | | 87/9 |
| 2,223,317 | A | * | 11/1940 | Ewing ..................... D04C 5/16 |
| | | | | 140/30 |
| 3,222,016 | A | * | 12/1965 | Boone .................... B64D 17/02 |
| | | | | 244/145 |
| 3,578,529 | A | * | 5/1971 | Baker .................... B29C 53/805 |
| | | | | 156/441 |
| 3,633,850 | A | * | 1/1972 | Feldman ................. B64C 27/16 |
| | | | | 244/172.6 |
| 4,517,715 | A | * | 5/1985 | Yoshida .................. D04B 1/16 |
| | | | | 28/165 |
| 5,764,518 | A | * | 6/1998 | Collins .................. B25J 9/1617 |
| | | | | 700/95 |
| 6,173,922 | B1 | * | 1/2001 | Hoyt ........................ B64G 1/64 |
| | | | | 244/164 |
| 6,431,497 | B1 | * | 8/2002 | Hoyt ........................ D04C 3/08 |
| | | | | 244/158.2 |
| 6,508,036 | B1 | * | 1/2003 | Cadogan ................ B64G 1/645 |
| | | | | 52/750 |
| 7,913,954 | B2 | * | 3/2011 | Levin ....................... B64G 1/32 |
| | | | | 244/171.5 |
| 9,150,312 | B2 | * | 10/2015 | Ellinghaus ............. B64G 1/244 |
| 9,845,554 | B2 | * | 12/2017 | Zhang ...................... H01B 1/24 |
| 9,896,788 | B2 | * | 2/2018 | Kapsali ................. D04H 1/43918 |
| 11,585,020 | B2 | * | 2/2023 | Kawamoto ............ B64G 1/648 |
| 11,773,516 | B2 | * | 10/2023 | Göktepe .................. D02G 3/26 |
| | | | | 442/303 |
| 2003/0010870 | A1 | * | 1/2003 | Chafer ................... B64G 1/222 |
| | | | | 244/171.5 |
| 2011/0039088 | A1 | * | 2/2011 | Lee ........................ B29C 44/357 |
| | | | | 428/222 |
| 2011/0209557 | A1 | * | 9/2011 | Burns ...................... D02G 3/32 |
| | | | | 29/428 |
| 2015/0247267 | A1 | * | 9/2015 | Corey .................... D03D 15/56 |
| | | | | 428/221 |
| 2016/0067919 | A1 | * | 3/2016 | Hoyt ..................... B29C 70/205 |
| | | | | 425/375 |
| 2016/0251778 | A1 | * | 9/2016 | Zhang ............... C04B 35/62855 |
| | | | | 428/408 |
| 2017/0268830 | A1 | * | 9/2017 | Leonard ................. D02G 3/448 |
| 2019/0315497 | A1 | * | 10/2019 | Blomquist ............. B64G 1/244 |
| 2021/0198817 | A1 | * | 7/2021 | Göktepe .................. F03G 7/06 |

FOREIGN PATENT DOCUMENTS

| | | |
|---|---|---|
| JP | S52-24489 | 2/1977 |
| JP | 2002-273537 | 9/2002 |
| WO | 2019-093520 | 5/2019 |

OTHER PUBLICATIONS

Search Reporting for Finnish Application No. 20205268, dated Sep. 30, 2020 (2 pages).

Seppänen, H., "Ultrasonically manufactured space tether" Mar. 2015, Department of Physics, Faculty of Science, University of Helsinki (35 pages).

* cited by examiner

DEVICE FOR MANUFACTURING A WEAVE

This application is the U.S. national phase of International Application No. PCT/FI2021/050185 filed Mar. 15, 2021 which designated the U.S. and claims priority to FI 20205268 filed Mar. 16, 2020, the entire contents of each of which are hereby incorporated by reference.

FIELD OF THE INVENTION

The present invention relates to a device for manufacturing of fabrics, ropes, cables and nets, and more particularly to a device for manufacturing a weave made of wires.

BACKGROUND OF THE INVENTION

The electric sail is a new space propulsion concept which uses the solar wind momentum for producing thrust. A full-scale electric sail consists of many long and thin conducting tethers i.e. weaves made of wires. The spacecraft contains a solar-powered electron gun which is used to keep the spacecraft and the wires in a high positive potential. The electric field of the wires extends into the surrounding solar wind plasma, which enables the solar wind ions to detect the wires as rather thick and wide obstacles. A technical concept exists for deploying the wires in a relatively simple way and guiding the resulting spacecraft electrically.

Some of the problems associated with the electric sail is how to manufacture the weaves fast, reliably and cost-efficiently, and while in the spacecraft, the weaves can be deployed easily to its full length. The pattern of the weave should be designed so that if a meteor or space debris damages part of the weave, it will not begin unwinding itself.

Manufacturing these patterns has been difficult for multiple reasons. The extremely thin metallic wires, such as less than 50 microns, are fragile, so the manufacturing mechanism should contact or deform or both the individual wires and the completed weave as little as possible. The strain on the wires and the weave should also vary as little as possible during the manufacturing process in order to achieve steady and predictable quality.

BRIEF DESCRIPTION OF THE INVENTION

An object of the present invention to provide a device for manufacturing a weave to overcome the above problems. The objects of the invention are achieved by the device which is characterized by what is stated in the independent claim. The preferred embodiments of the invention are disclosed in the dependent claims.

The invention is based on the idea of having a device of manufacturing a weave made of longitudinal wires and a crossing wire forming a loop around each longitudinal wire.

Advantages of the weave and device of the invention are that a joint between two thin wires is reliable to manufacture automatically and with steady quality, the weave is tolerant to different environments in space and different conditions between the process from manufacture of the weave to the launch to space.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
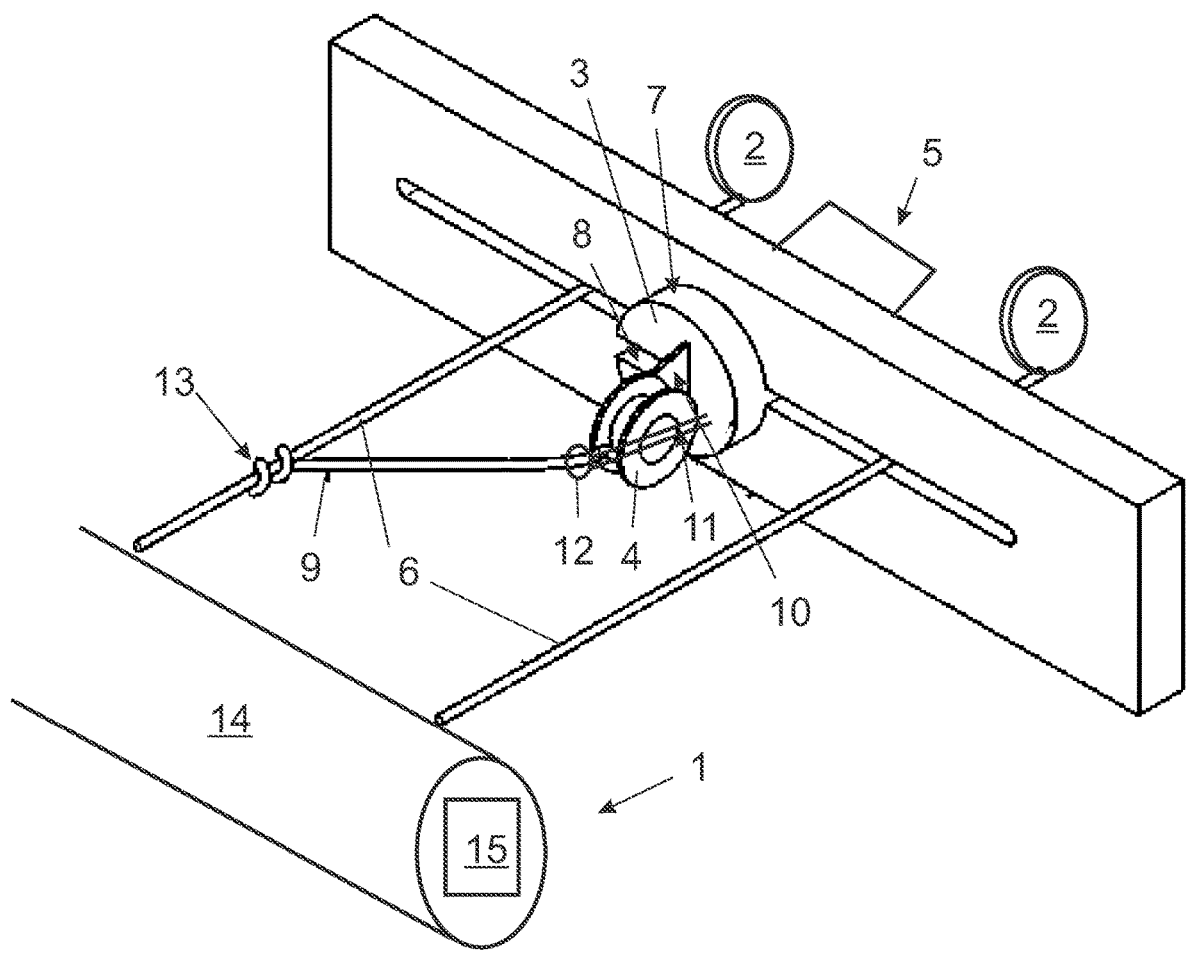
FIG. 1 illustrates a first embodiment of a device for manufacturing a weave.

FIG. 1 illustrates an embodiment of a device for manufacturing a weave. The device comprises a winder 1, at least two wire spools 2, a wire spool carrier 3 and additional wire spool 4 releasably attached to the wire spool carrier 3 and an actuator 5.

The wire spools 2 are arranged to release longitudinal wires 6 to the winder 1, wherein each wire spool 2 releases one single longitudinal wire 6. Distance between said longitudinal wires 6 is predetermined but adjustable, and to facilitate at keeping the distance constant during operation, hollow tubes (not shown in Figures) may be utilized to guide the longitudinal wires 6 from the wire spools 2 toward the winder 1. The distance between the longitudinal wires 6 may be 5 to 8 cm, for instance, and each wire spool 2 may contain kilometres long wire, which is typically 2 km long but not limited to it. Some wire spools 2 may contain up to 7-10 km long wires. The distance between the longitudinal wires 6 may be adjusted by adjusting the distance between their respective wire spools 2.

The wire spool carrier 3 comprises a wheel 7. In the following, it will be by example be assumed that the wheel 7 is a cogwheel, though in all implementations this is not necessary that the wheel 7 is provided with gear coupling, as the actuator 5 may rotate the wheel 7 via an axle. In this implementation the cogwheel 7 comprises a gear coupling, such as inserted teeth or cogs, and a slit 8 extending through the cogwheel 7 from a centre of the wire spool carrier 3 to the circumference. The slit 8 should be wider than the hollow tube to allow the hollow tube to pass through the slit 8. The cogwheel 7 may have a helix angle making it a helical gear. The cogwheel 7 can be for instance 3-5 cm in diameter, making the slit 8 1.5-2.5 cm long.

The additional wire spool 4 is releasably attached to the wire spool carrier 3 and arranged to release a crossing wire 9. The additional wire spool 4 may be arranged with a spool holder 10 which can be releasably attached to a protrusion of the wire spool carrier 3 by means of a screw and nut, for instance.

An additional guide 11 may be attached to the wire spool carrier 3 for guiding the crossing wire 9 from the additional wire spool 4 through a hole 12. The guide 11 is arranged to steer the crossing wire 9 from the additional wire spool 4 with a steady speed and tension. An opening can be arranged next to the hole 12 to facilitate the crossing wire 9 forming a loop 13 around the longitudinal wire 6. In this context, the term "loop" refers to a section of a wire that is wound at least once around another wire. However, in some embodiments, the guide 11 is not necessary.

The actuator 5 is configured to move the wire spool carrier 3 between the longitudinal wires 6 such way that the additional wire spool 4 in turns moves to each longitudinal wire 6 to a position where the respective longitudinal wire 6 is located in the slit 8 of the wire spool carrier 3 at which stage the cogwheel 7 rotates around said respective longitudinal wire 6 to form the loop 13. The wire spool carrier 3 can rotate for instance 2-4 rotations around the longitudinal wire 6. Then the cogwheel 7 moves towards a following longitudinal wire 6 in such way that a predetermined path of the crossing wire 9 from the additional wire spool 4 of the wire spool carrier 3 forms the weave with the longitudinal wires 6 from the wire spools 2. The actuator 5 may comprise a power source, control system and electric motor, for instance.

In the FIG. 1, only two wire spools 2 and longitudinal wires 6 are shown. However, more than two wire spools 2 and longitudinal wires 6 may be arranged to weave a wider weave.

The winder 1 is provided for reeling the manufactured weave to a rotating reel 14 which may be connected to a winding motor 15. When the weave with desired length is completed, the reel 14 can be removed from the winder 1. In some embodiments, actuation of the winding motor 15 is timed with the movements of the wire spool carrier 3 in such way that when the wire spool carrier 3 is moving between the longitudinal wires 6, the winding motor 15 is configured to wind the weave on the rotating reel 14, and when the wire spool carrier 3 is rotating around the longitudinal wire 6, the winding motor 15 is configured to halt the winding.

The longitudinal wires 6 from the wire spools 2 may have a different diameter than the crossing wire 9 from the wire spool carrier 3. For example, the longitudinal wire 6 may have a diameter of 40-80 microns and the crossing wire 9 may have 20-50 microns. Alternatively, all the wires can have a same diameter, which may range from 20 to 80 microns. The wires are made from an electrically conductive material, such as aluminium or copper. Aluminium is advantageous in Low Earth Orbit (LEO) satellites as it resists atomic oxygen due to its oxidized surface and copper is usable in deep space applications, where atomic oxygen is not prevalent.

Figure 2:
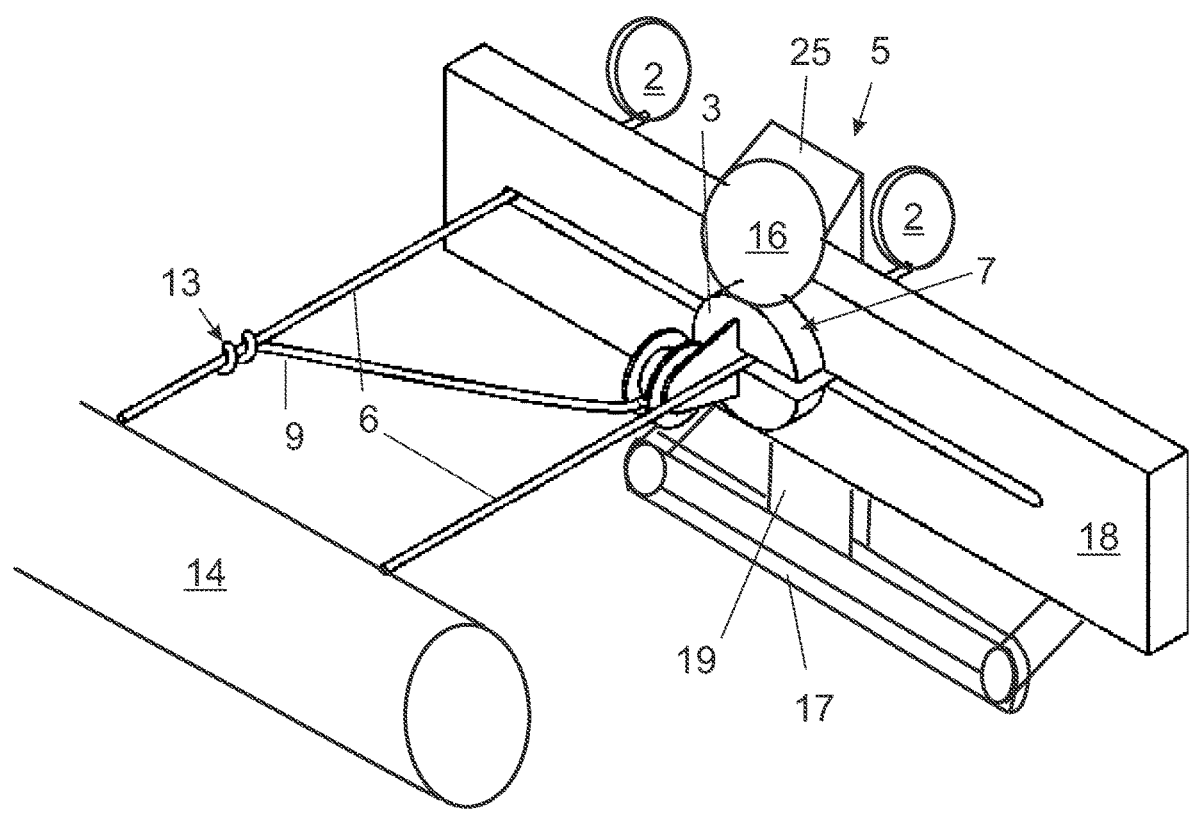
FIG. 2 illustrates a second embodiment of the device for manufacturing the weave.

FIG. 2 illustrates a second embodiment of the device for manufacturing a weave. The embodiment is very similar to the one explained in connection with FIG. 1. Therefore, the embodiment of FIG. 2 is mainly explained by pointing out the differences between these embodiments.

A second cogwheel 16 is connected to the meshing cogwheel 7 of the wire spool carrier 3 in such way that the second cogwheel 16 is arranged to rotate the cogwheel 7 of the wire spool carrier 3 by transferring torque from the actuator 5. The actuator 5 may comprise a cogwheel motor 25 connected to the second cogwheel 16 for rotating the second cogwheel 16 clockwise or anticlockwise. The actuator 5 further comprises a linear transfer component 17, such as a drive belt or ball screw, and a linear rail configuration 18 moving the wire spool carrier 3 and the second cogwheel 16 transversally in relation to the longitudinal wires 6.

The drive belt may be a timing belt with teeth molded onto its inner surface and designed to run over matching toothed pulleys or sprockets. A linear transfer motor 19 connected to the toothed pulley or sprocket is configured to transform the rotational motion to linear motion of the drive belt. The ball screw transforms rotational motion to linear motion with minimal friction and is made to close tolerances and therefore suitable for use in situations requiring high precision.

The linear rail configuration 18 in this instance may be a frame, wherein the actuator 5 and wire spools 2 are arranged on one side of the frame and the wire spool carrier 3 and the second cogwheel 16 are arranged on other side of the frame so that the longitudinal wires 6 can pass through the frame via an elongated slot within the frame. The linear rail configuration 18 is arranged to move together with the wire spool carrier 3, second cogwheel 16, cogwheel motor 25, linear transfer component 17 and linear transfer motor 19. The linear rail configuration 18 may be surrounded by a support structure (not shown in Figures) which is stationary in relation to the wire spool carriers 2 while the linear rail configuration 18 moves transversally within the support structure.

With this setup, it is possible to use different wire spool carrier 3 models and weave patterns without requiring extensive modifications to the device platform. In this embodiment, rotational torque of the cogwheel motor 25 to rotate the wire spool carrier 3 is transmitted via the gear coupling of the second cogwheel 16 and the cogwheel 7 of the wire spool carrier 3. This type of rotational torque transmission works also with the helical gear profile since there are multiple points of teeth contact during the rotation. Required torque to rotate the wire spool carrier 3 is so low that the performance loss in the torque transmission due to partial contact is negligible.

Figure 3:
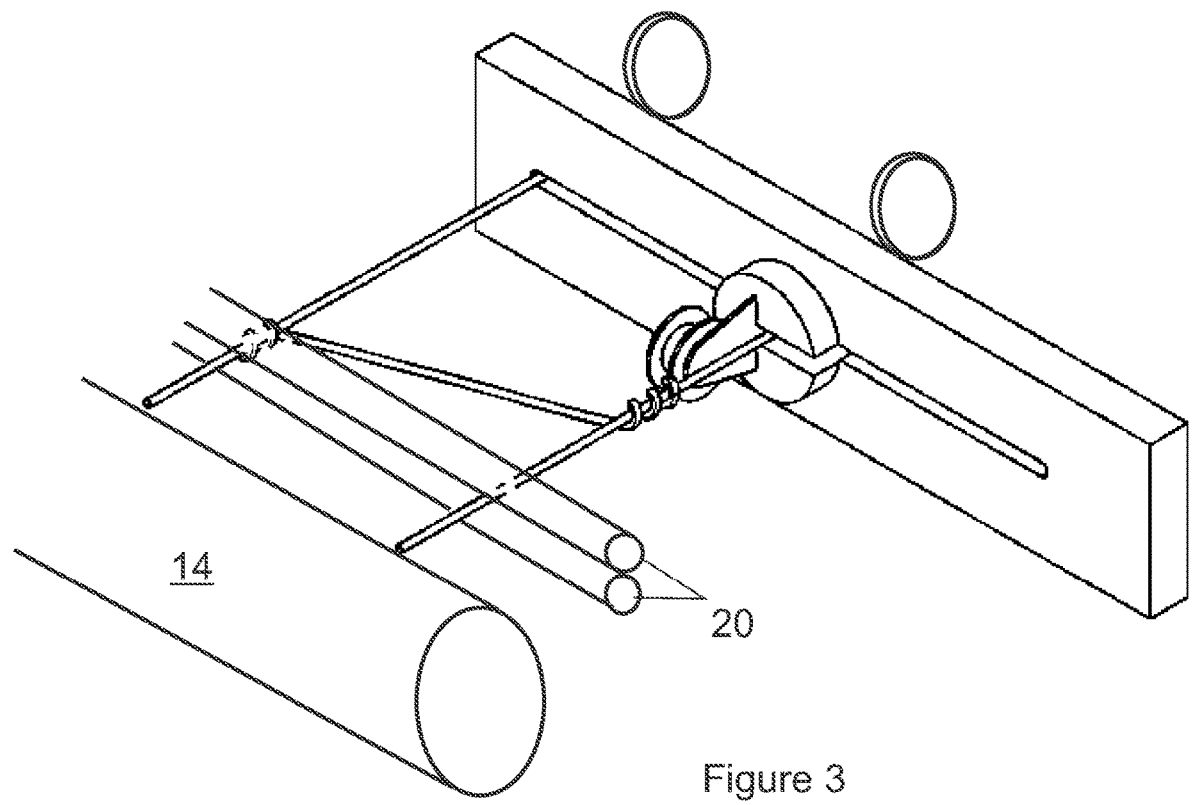
FIG. 3 illustrates a third embodiment of the device for manufacturing the weave.

FIG. 3 illustrates a third embodiment of the device for manufacturing a weave. The embodiment is very similar to the one explained in connection with FIG. 1. Therefore, the embodiment of FIG. 3 is mainly explained by pointing out the differences between these embodiments.

In FIG. 3, the device further comprises a pair of rollers 20 arranged in parallel to receive the weave in between them to compress the loops 13 before reeling the weave to the rotating reel 14. This compression flattens the weave into a plane such that the weave is more compressed during the winding which saves space and bonds the loops 13 around longitudinal wires 6. The bonding adds more contact surface between the loops 13 and the longitudinal wires 6.

Alternatively, this bonding can be arranged by melting the loops 13 together with the longitudinal wires 6 above the melting temperature of the wires 6, 9. When a single wire brakes due to micrometeorites, for instance, the rest of the weave remain intact due to the resilience of the bonding.

Figure 4:
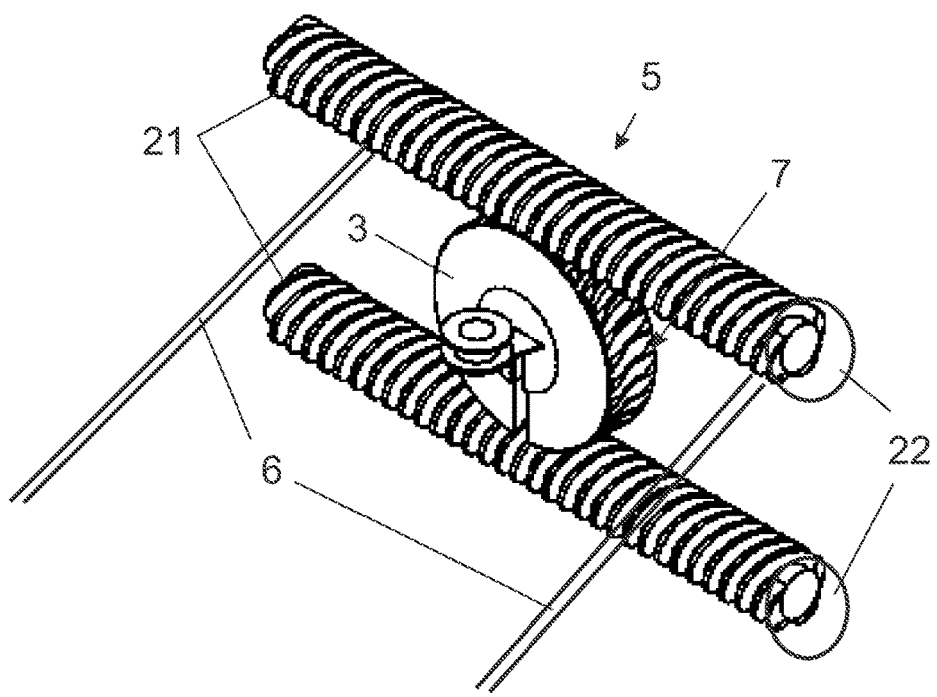
FIG. 4 illustrates another embodiment of a part of the device for manufacturing the weave.

FIG. 4 illustrates another embodiment of the actuator 5 of the device for manufacturing a weave. The rest of the device is very similar to the one explained in connection with FIG. 1. Therefore, the embodiment of FIG. 4 is mainly explained by pointing out the differences of the actuator 5.

In this embodiment, the second cogwheel 16, the cogwheel motor 25, the linear transfer component 17, the linear rail configuration 18 and the linear transfer motor 19 are replaced by two parallel longitudinal screws 21 on opposite sides of the wire spool carrier 3 and a separately operated motor 22 for each longitudinal screw 21. The longitudinal screws 21 together with their rotary motors 22 actuate rotation movement and transversal movement of the wire spool carrier 3 between the longitudinal wires 6.

Each parallel longitudinal screw 21 has a helix angle meshing with the circumference of the cogwheel 7 of the wire spool carrier 3 in such way that a first longitudinal screw 21 is above the cogwheel 7 and a second longitudinal screw 21 is below the cogwheel 7.

When the two parallel longitudinal screws 21 have a different direction of rotation but a same speed, the wire spool carrier 3 is arranged to perform rotation movement, and when the two parallel longitudinal screws 21 have a same direction of rotation and a same speed, the wire spool carrier 3 is arranged to perform transversal movement.

The advantage of this embodiment is to have a lightweight device while achieving high production speeds without harmful vibrations and deflections or wear of moving components.

The previous embodiments relate to 2-dimensional weave patterns. However, manufacturing a 3-dimensional weave pattern is not excluded. Generally, the wire spool carrier 3 can be carried by an open-ended grabbing mechanism, for example a robotic arm, and can pass the wire spool carrier 3 to another actuator. This mechanism is suited for both 2-dimensional and 3-dimensional weave patterns and is not physically constrained in any 3-dimensional axis or orientation. This implementation is possible to combine with other embodiments.

The device can produce different topologies of weaves which enable the weave to maintain integrity in space conditions. Countering space environmental constraints such as atomic oxygen, and micrometeorites as well as minimizing surface area to minimize surface charges and currents forming into the weave. Minimizing launch weight but maximizing length are constraints to match. Multiple longitudinal wires and 2 or 3 dimensionalities in the structure are advantageous, as is minimizing wire surface area by using as thin wires as possible. Two dimensional topologies can be extended to three dimensions by adding a third carrier, for instance.

The invention claimed is:

1. A device for manufacturing a weave, the device comprising:
   a winder for reeling the manufactured weave to a rotating reel,
   wire spools, comprising longitudinal wires, arranged to release said longitudinal wires to said winder,
   a wire spool carrier comprising a wheel and a slit extending through the wheel from a centre of the wire spool carrier to the circumference,
   an additional wire spool, comprising a crossing wire, releasably attached to the wire spool carrier and arranged to release said crossing wire, and
   an actuator configured to move, in use, the wire spool carrier between the longitudinal wires such that the additional wire spool in turns moves to each longitudinal wire to a position where the respective longitudinal wire is located in said slit at which stage the wheel is rotatable around said respective longitudinal wire to wound a section of said crossing wire at least once around said respective longitudinal wire before moving towards a following longitudinal wire in such a way that a predetermined path of the crossing wire from the additional wire spool forms the weave with the longitudinal wires from the wire spools.

2. The device according to claim 1, wherein said wheel is a cogwheel and the device further comprises
   a second cogwheel connected to the wire spool carrier, and
   the actuator further comprising a linear transfer component and a linear rail configuration moving the wire spool carrier and the second cogwheel transversally in relation to the longitudinal wires.

3. The device according to claim 1, wherein said wheel is a cogwheel and the device further comprises
   two parallel longitudinal screws on opposite sides of the cogwheel of the wire spool carrier, and
   a separately operated motor for each longitudinal screw which together the motors actuate rotation movement and transversal movement of the wire spool carrier between the longitudinal wires.

4. The device according to claim 1, wherein the longitudinal wires from the wire spools have a different diameter than the crossing wire from the additional wire spool.

5. The device according to claim 1, wherein the diameter of the wires is 20-80 microns.

6. The device according to claim 1, wherein the device further comprises a pair of rollers arranged in parallel to receive the weave in between them to compress the weave before reeling to the rotating reel.

7. The device according to claim 1, wherein the wire is made from electrically conductive material.

8. The device according to claim 7, wherein the wire is made from one of aluminium or copper.

* * * * *